(12) United States Patent
Partani et al.

(10) Patent No.: US 8,144,160 B2
(45) Date of Patent: Mar. 27, 2012

(54) METHODS AND APPARATUS FOR NON-INTRUSIVE CAPTURING OF FRAME BUFFER MEMORY INFORMATION FOR REMOTE DISPLAY

(75) Inventors: Dwarka Partani, San Jose, CA (US); Sujith Arramreddy, San Jose, CA (US); Balakrishna Jayadev, San Jose, CA (US)

(73) Assignee: Emulex Corporation, Costa Mesa, CA (US)

( * ) Notice: Subject to any disclaimer, the term of this patent is extended or adjusted under 35 U.S.C. 154(b) by 877 days.

(21) Appl. No.: 12/031,112

(22) Filed: Feb. 14, 2008

(65) Prior Publication Data

US 2008/0291210 A1 Nov. 27, 2008

Related U.S. Application Data

(60) Provisional application No. 60/890,405, filed on Feb. 16, 2007, provisional application No. 60/892,540, filed on Mar. 1, 2007.

(51) Int. Cl.
*G09G 5/36* (2006.01)
*G06F 13/00* (2006.01)

(52) U.S. Cl. ......... 345/545; 345/537; 345/538; 345/547

(58) Field of Classification Search .................. 345/537, 345/538, 545, 547, 555, 531, 548
See application file for complete search history.

(56) References Cited

U.S. PATENT DOCUMENTS

| 5,812,820 A | 9/1998 | Loram |
| 6,054,823 A | 4/2000 | Collings et al. |
| 6,157,989 A | 12/2000 | Collins et al. |
| 6,378,009 B1 | 4/2002 | Pinkston, II et al. |
| 6,378,014 B1 | 4/2002 | Shirley |
| 6,388,658 B1 | 5/2002 | Ahern et al. |
| 6,476,854 B1 | 11/2002 | Emerson et al. |
| 6,567,869 B2 | 5/2003 | Shirley |
| 6,671,756 B1 | 12/2003 | Thomas et al. |
| 6,672,896 B1 | 1/2004 | Li |
| 6,681,250 B1 | 1/2004 | Thomas et al. |
| 6,710,790 B1 | 3/2004 | Fagioli |
| 6,915,362 B2 | 7/2005 | Ramsey et al. |
| 6,931,475 B2 | 8/2005 | Huang et al. |
| 6,961,798 B2 | 11/2005 | Ferguson |
| 7,228,345 B2 | 6/2007 | Larson et al. |

(Continued)

OTHER PUBLICATIONS

Hewlett-Packard Development Company, LP; "Integrated Lights-Out Virtual Serial Port Configuration and Operation". Howto, 2nd edition, 2005, 20 pages. Hewlett-Packard Development Company, LP.

(Continued)

*Primary Examiner* — Hau Nguyen
(74) *Attorney, Agent, or Firm* — Alford Law Group, Inc.; William E. Alford

(57) ABSTRACT

Modification to frame buffer memory information associated with a first display may be used to update information displayed on a second display. The first display may be mapped to a matrix of display areas. The modification to the frame buffer memory information may be detected be detecting write memory address. One or more display areas affected by the modification to the frame buffer memory information may be identified based on display parameters associated with the first display. Frame buffer memory information associated with the one or more affected display areas may be retrieved and compressed before being transmitted over a communication link to be displayed on the second display.

33 Claims, 8 Drawing Sheets

U.S. PATENT DOCUMENTS

| | | | |
|---|---|---|---|
| 7,403,204 B2 | 7/2008 | Emerson et al. | |
| 7,424,419 B1 | 9/2008 | Fike et al. | |
| 7,447,995 B2 | 11/2008 | Luciani, Jr. et al. | |
| 7,502,878 B1 | 3/2009 | Wright | |
| 7,519,747 B1 | 4/2009 | Cory et al. | |
| 7,519,749 B1 | 4/2009 | Sivertsen | |
| 7,817,157 B2 * | 10/2010 | Emerson et al. | 345/537 |
| 7,827,258 B1 | 11/2010 | Kalbarga | |
| 7,861,171 B2 | 12/2010 | Johanson et al. | |
| 2003/0084133 A1 | 5/2003 | Chan et al. | |
| 2006/0164406 A1 * | 7/2006 | Emerson et al. | 345/204 |
| 2006/0168099 A1 | 7/2006 | Diamant | |
| 2006/0248360 A1 | 11/2006 | Fung | |
| 2007/0101173 A1 | 5/2007 | Fung | |

OTHER PUBLICATIONS

"Remote access eliminates 'house calls'" 2004. Communications News. 2 pages. http://www.comnews.com/stories/articles/1104/1104remote_access.htm.

Shilmover, B. "Hardware Management in Microsoft Windows Server 2003 R2 RC0" Part 1 and 3. 2007 Microsoft Corporation. 17 pages.

Zhuo, H.; Yin, J.; Rao, A. "Remote Management with the Baseboard Management Controller in Eighth-Generation Dell PowerEdge Servers" Dell Power Solutions. 2004. p. 26-29.

* cited by examiner

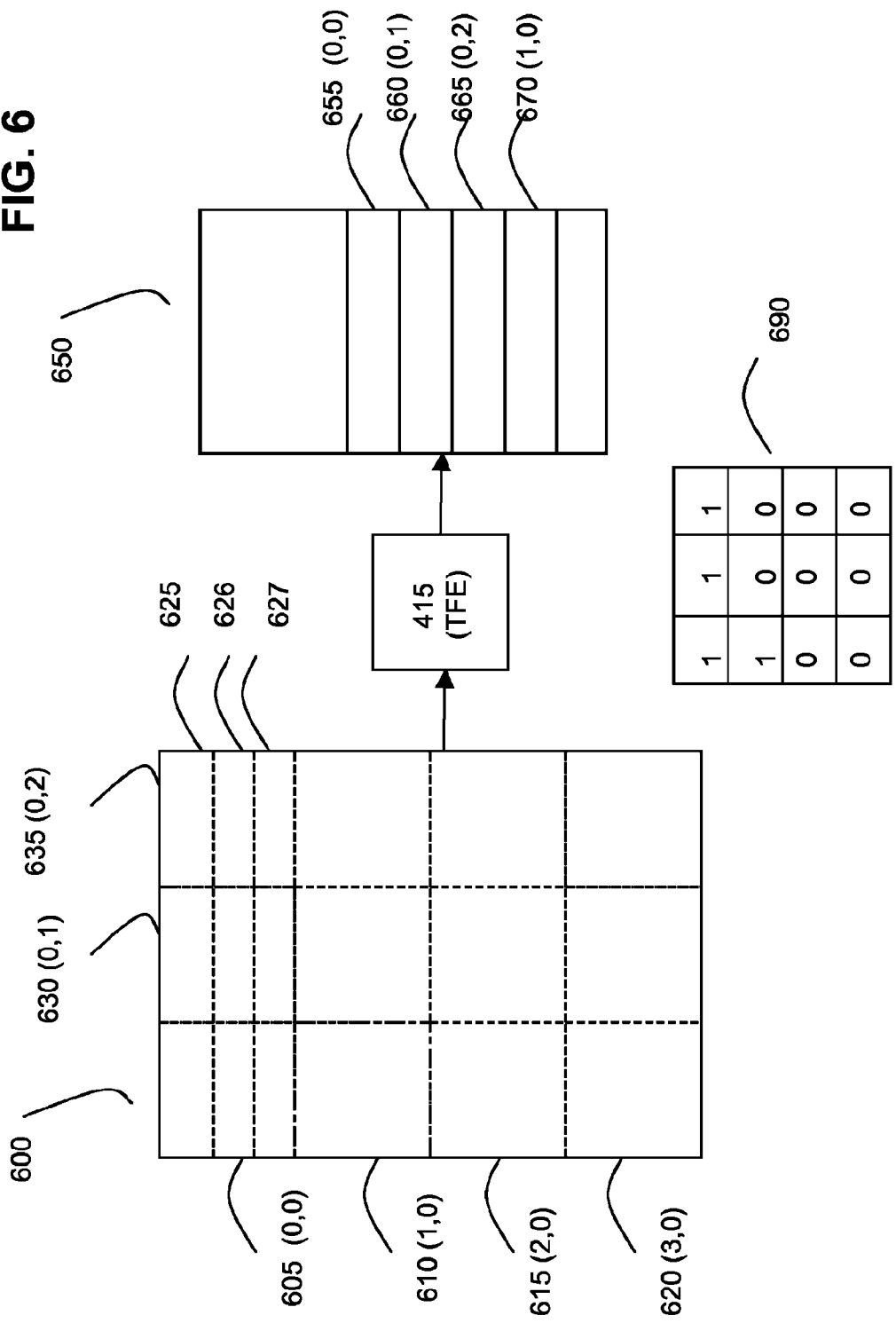

METHODS AND APPARATUS FOR NON-INTRUSIVE CAPTURING OF FRAME BUFFER MEMORY INFORMATION FOR REMOTE DISPLAY

CROSS-REFERENCE TO RELATED APPLICATIONS

This non-provisional United States (U.S.) patent application claims the benefit of U.S. provisional patent application No. 60/890,405 entitled INTEGRATED MANAGEMENT, GRAPHICS AND I/O CONTROL FOR SERVER SYSTEMS filed on Feb. 16, 2007 by inventors Dwarka Partani et al. and U.S. provisional patent application No. 60/892,540 entitled METHODS AND APPARATUS FOR NON-INTRUSIVE CAPTURING OF FRAME BUFFER MEMORY INFORMATION FOR REMOTE DISPLAY filed on Mar. 1, 2007 by inventors Dwarka Partani et al.

FIELD OF THE INVENTION

The present invention relates generally to field of data management. More specifically, the present invention relates to methods and apparatus for capturing data for remote display.

BACKGROUND

In many computer systems, information displayed on a display is stored in a frame buffer memory. The frame buffer memory may be coupled to a graphics controller which may be coupled to a main processor. The graphics controller may include a display controller coupled to the display. The display controller may refresh the information displayed on the display 60 to 80 times per second (hertz).

In certain environment, it may be necessary to have a remote display to enable a user in a remote location to view information that could be displayed on a local display. Having a remote display capability is advantageous because the remote user may be able to perform functions remotely without having to be on site. It is typically cost prohibitive to have a communication link with sufficient bandwidth to enable the remote user to have the same user experience as a local user.

BRIEF DESCRIPTION OF THE DRAWINGS

The present invention is illustrated by way of example, and not limitation, in the figures of the accompanying drawings in which like references indicate similar elements and in which:

FIG. 6 illustrates an example of a memory area that stores display tiles that have been modified, in accordance with some embodiments.

DETAILED DESCRIPTION

For some embodiments, methods and systems for capturing frame buffer memory information to be used on a remote display is disclosed. Instead of using display information from a display controller associated with a local display, frame buffer memory information may be captured from a graphics controller associated with the display controller. Modification to the frame buffer memory information may be identified and compressed. Compressed information and information about where the modification occurs in the frame buffer memory may be transmitted to a remote computer system associated with the remote display. For some embodiments, the information may be transmitted over a limited bandwidth communication link.

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Server Farm with Server Management

Figure 1:
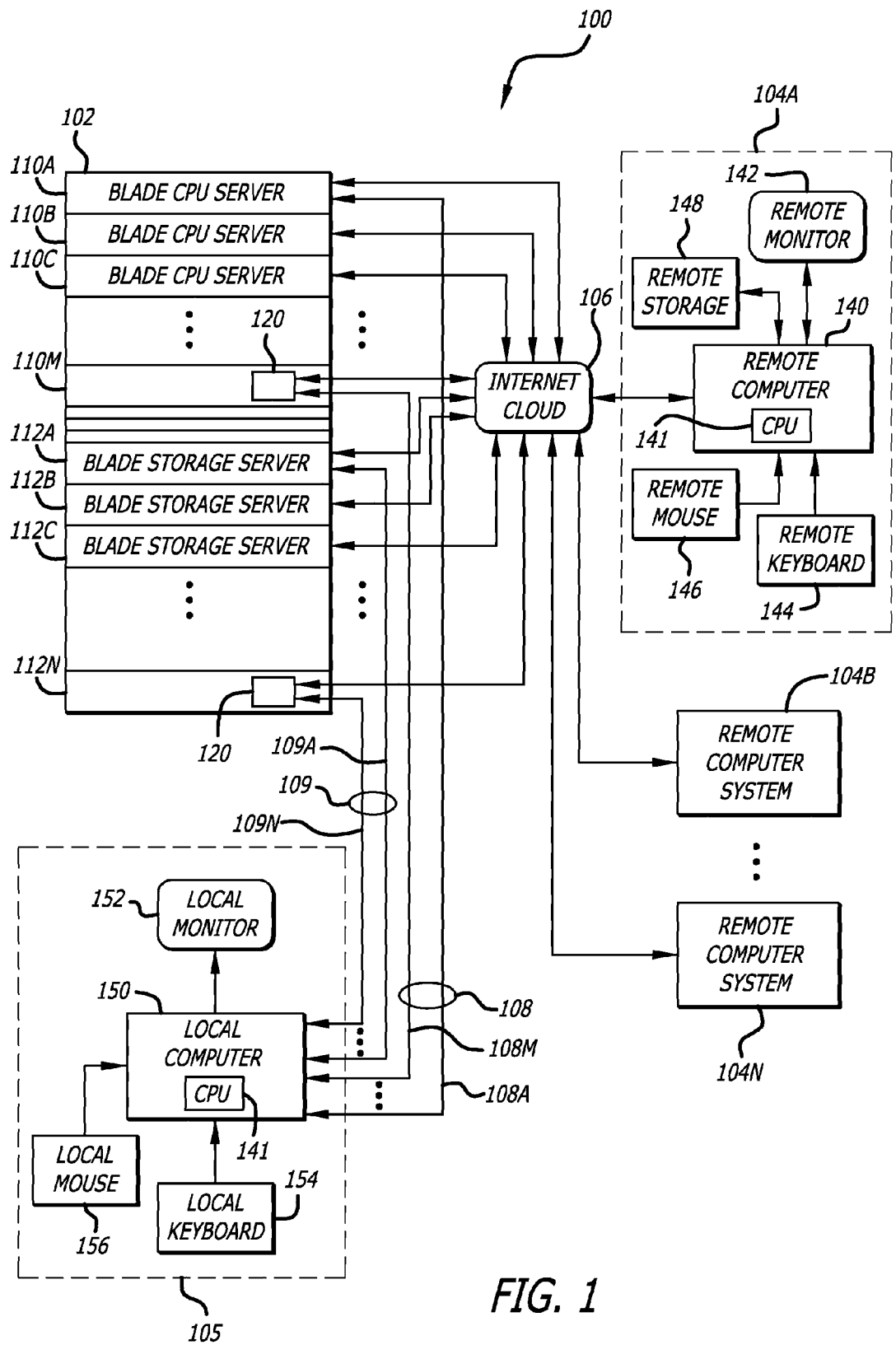
FIG. 1 is a block diagram of a server farm system with local/remote server management in accordance with one embodiment of the invention.

Referring now to FIG. 1, a server farm system 100 is illustrated with local and remote server management in accordance with one embodiment of the invention. The server farm system 100 includes a server farm 102, one or more remote computer systems 104A-104N at remote locations coupled to the server farm 102 via a local area network (LAN) or a wide area network (WAN) 106, such as the internet, and a local computer system 105 coupled to the server farm 102 via a local communication connection 108,109. The local communication connection 108,109 to the server farm 102 may be a local area network connection (LAN) or a serial communication connection, such as RS232 or universal serial bus (USB).

The server farm 102 may include a plurality of central processing unit (CPU) servers 110A-110M and a plurality of storage servers 112A-112N, each including one or more integrated management, graphics, input/output local/remote controller chips 120. The integrated management, graphics, input/output local/remote controller chip 120 may also be referred to as an integrated intelligent global server management chip. The plurality of central processing unit servers 110A-110M and the plurality of storage servers 112A-112N when having a form factor for mounting into a rack may be referred to as blade CPU servers and blade storage servers, respectively. Collectively, the plurality of central processing unit (CPU) servers 110A-110M and the plurality of storage servers 112A-112N may be simply referred to as a server.

The one or more remote computer systems 104A-104N may each include a remote computer 140 with a CPU 141, a remote monitor 142, a remote keyboard 144, a remote mouse 146, and a remote storage device 148 coupled together as shown. The one or more remote computer systems 104A-104N may be considered to be remote clients to the servers as part of a client-server system. Moreover, one or more of the remote computer systems 104A-104N may be used to provide remote management and control of the servers in the server farm. Server management client software may be executed on one or more of the remote computer systems in order to remotely manage and control the servers in the server farm. Additionally, web browser software may be used to executed by the one or more of the remote computer systems in order to gain access to a web site provided by the integrated intelligent global server management chip 120 and remotely manage and control the servers in the server farm.

The local computer system 105 is co-located with the server farm 102 to locally perform server management. That is, the local computer system 105 is located in the same room as the server farm 102. In contrast, the one or more remote computer systems 104A-104N are at remote locations to remotely perform server management. That is, the one or more remote computer systems 104A-104N are in at least a different room in the same building or otherwise in a different building, city, state, or country than the server farm 102.

Figure 2:
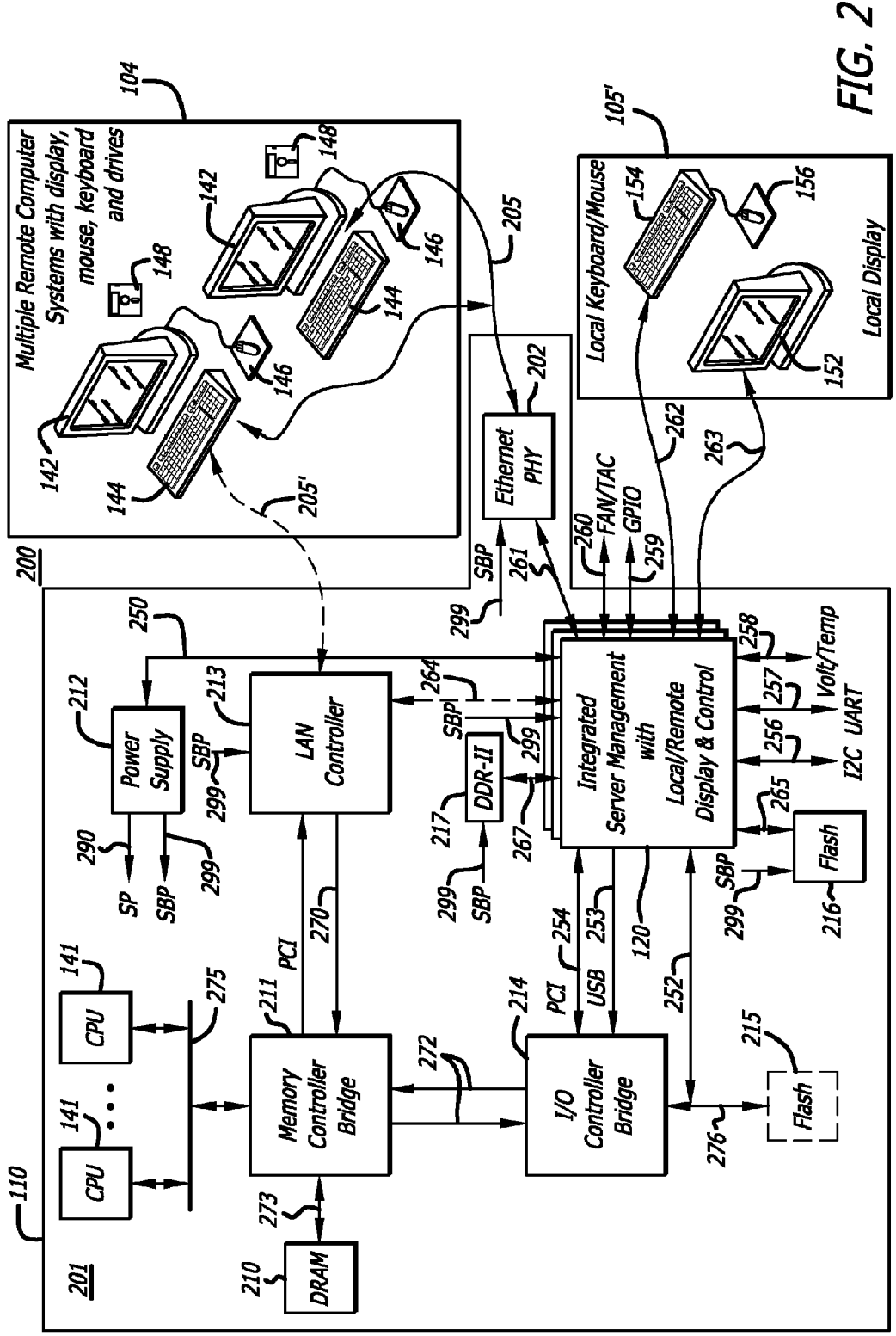
FIG. 2 is a block diagram of a local/remote server management system in accordance with another embodiment of the invention.

The local computer system 105 may include a local computer 150 with a CPU 141, a local monitor 152, a local keyboard 154, and a local mouse 156 coupled together as shown. In one embodiment of the invention, the local computer system 105 does not include the local computer 150 so that the local monitor 152 couples to a graphics controller in the chip 120 of one of the servers 110,112 and the local keyboard 154 and the local mouse 156 couple to an I/O controller in the chip 120. FIG. 2 illustrates a local keyboard/mouse/display system 105', absent the computer 150 and CPU 141, coupled to an integrated management, graphics, input/output local/remote controller chip 120.

Local server management involves provide server management services in the same room as the server farm 102 with the local computer system. In contrast, remote server management involves providing server management services at a remote location via remote keyboard, video, mouse, & storage (KVMS) at a remote computer system in one embodiment of the invention. Generally, server management services may include monitoring, controlling, maintaining, upgrading, failure resolution, downtime prevention, availability, and performance reporting of the server farm, its servers and the components within each server. The integrated management, graphics, input/output local/remote controller chip 120 facilitates remote server management as well as local server management.

Server Management System

Referring now to FIG. 2, a local/remote server management system 200 is illustrated including a server system 110, one or more remote computer systems 104, and a local keyboard/mouse/display system 105' coupled together as shown. The one or more remote computer systems 104 couple to the server system 110 via a wide area network connection 205. The local keyboard/mouse/display system 105' couples to the server system 110 by one or more serial communication links 262-263, such as RS232, a PS/2, or universal serial bus (USB); a serial over local area network (SOL) communication link, and/or by a direct monitor cable carrying analog/digital red-green-blue (RGB) signals.

The server system 110 includes a printed circuit board 201 with a number of integrated circuits mounted thereto, including one or more integrated management, graphics, input/output local/remote controller chips 120 for one or more processors (CPU) 141, respectively. The server system 110 may include the one or more integrated management, graphics, input/output local/remote controller chips 120; the one or more processors (CPU) 141, scratch pad memory DRAM 210, a memory controller 211, a power supply 212, a local area network interface controller (NIC) 213, a physical network interface device 202, an input/output controller 214, an optional non-volatile flash memory 215, a non-volatile flash memory 216, and a frame buffer memory 217 coupled together as shown in FIG. 2. A number of busses 252-254, 270, 272, 273, 275, 276 may be further used to couple elements of the server system 110 together as shown.

The power supply 212 generates a system power (SP) 290 that is provided to a substantial portion of the server system 110 and a standby power (SBP) 299 that is coupled to the one or more integrated management, graphics, input/output local/remote controller chips 120; the network interface controller 213, the non-volatile flash memory 216; the frame buffer memory 217; and a physical network interface device 202. The system power 290 may be switched on and off by the power supply 212 in response to a power supply (PS) control signal 250. The standby power 299 is generated provided that AC power is provided to the power supply 212. The power supply control signal 250 is generated by an integrated management, graphics, input/output local/remote controller chip 120. A power supply control signal 250 may be generated by each of the integrated management, graphics, input/output local/remote controller chips 120 and the power supply 212 may generate more than one system power that is coupled respectively to the one or more processors 141. In this manner, each processor 141 may be selectively powered down and powered back up by a respective power supply control signal 250. While the processors 141 and other elements of the server system may be selectively powered off, the standby power (SBP) 299 coupled to the one or more integrated management, graphics, input/output local/remote controller chips 120; the network interface controller 213, the non-volatile flash memory 216; the frame buffer memory 217; and a physical network interface device 202 keeps them powered up during such periods.

The flash memory 216 coupled to the one or more integrated management, graphics, input/output local/remote controller chips 120 may store software programs for execution by each. In particular, the flash memory 216 stores the basic input/output system (BIOS) software that is used to initialize the chip 120 and other hardware elements of the server 110. The BIOS also controls the boot process of the server 110 and provides low-level input/output routines to modify details of the system's hardware configuration. The contents of the flash memory 216 can be remotely managed to upgrade or program the firmware that is used by the integrated management, graphics, input/output local/remote controller chip 120 and/or to upgrade or program the firmware that is used by the server 110.

The frame buffer memory 217 coupled to the chips 120 is a random access memory for storage of frames of video or graphics display data that may be displayed locally by the local display 152 and/or remotely by one or more remote displays 142. Thus, the frame buffer memory 217 is shared by the local keyboard/mouse/display system 105' or the local computer system 105 and the remote computer systems 104. While an entire frame of video/graphical data may be stored in the frame buffer memory 217, partitioned tiles of the frame having video/graphics data that has changed from the last frame of data may be transmitted by the chip 120 to the remote computer systems 104 while the entire frame of video/graphical data is provided to the local display 152. Note that a portion of the frame buffer memory 217 is also used as a scratch pad memory by the server management controller 310 for executing program instructions and for data storage.

The physical network interface device 202 may be mounted to the printed circuit board 201. Each of the one or more chips 120 may have a network bus 261 that is coupled to the physical network interface device 202 to couple data onto and receive data from the local or wide area network connection 205.

One or more of the remote computer systems 104 may be clients of the server 110 as well and connect through the wide area network connection 205' instead of or in addition to the wide area connection 205. In this case, the integrated management, graphics, input/output local/remote controller chip 120 may optionally couple to the network interface controller 213 via bus 264 so that the remote computer system 104 that is a client may also provide remote server management.

The client connection over the wide area network connection 205' to the server 110 for data processing is typically faster than the wide area network connection 205 for remote server management. Thus, it is desirable to reduce the amount of data transmitted over the wide area network connection 205 to provide a remote KVM capability for remote server management.

The integrated management, graphics, input/output local/remote controller chip 120 couples to a low pin count (LPC) host interface bus 252, one or more universal serial buses (USB1.1 and USB2.0) 253, one or more PCI buses (PCI/PCI Express) 254 of the server system 110 to transmit and receive ("transceive") data with the I/O controller 214. The integrated management, graphics, input/output local/remote controller chip 120 further couples to six serial inter-integrated circuit ($I^2C$) busses 256, five universal asynchronous receiver transmitter busses 257, analog voltage/temperature monitor lines 258, a general purpose input/output (GPIO) bus 259, and fan control/fan tachometer busses 260.

The integrated management, graphics, input/output local/remote controller chip 120 directly monitors the voltage of the system power 290 and the temperature of the server and perhaps the ambient temperature sensed by sensors by way of the analog voltage/temperature monitor lines 258. The integrated management, graphics, input/output local/remote controller chip 120 controls one or more server fans and monitors their fan speeds by means of the fan control/fan tachometer busses 260 in response to the server temperature and perhaps ambient temperature sensed by sensors. The integrated management, graphics, input/output local/remote controller chip 120 can monitor other server parameters by way of coupling to other sensors and circuits through the six serial inter-integrated circuit ($I^2C$) busses 256. A current sensor coupled to the chip 120 may be used to sense the current being provided by the power supply to the server to provide an indication of power consumption for example. An air flow sensor may also be coupled to the chip 120 to monitor the air flow through the server. A humidity sensor may also be coupled to the chip 120 to monitor the humidity of the surrounding air. A smoke detection sensor may also be coupled to the chip 120 to monitor the surroundings of the server for fire in order to protect the operation of and the data stored in the server.

The integrated management, graphics, input/output local/remote controller chip 120 provides an analog and/or digital video/graphics output to couple to the local display 152 by a video/graphics cable 263. The integrated management, graphics, input/output local/remote controller chip 120 further provides a serial interface, such as a universal serial bus, to couple to the local keyboard 154 and the local mouse 156 by one or more serial cables 262.

Referring now to FIGS. 1 and 2, the integrated management, graphics, input/output local/remote controller chip 120 generally provides integrated server management, graphics control for local and remote video, input/output control, and remote keyboard-mouse control. The integrated management, graphics, input/output local/remote controller chip 120 can provide local and remote server management (baseboard management control) in compliance with the intelligent platform management interface (IPMI) standard as well as other server management standards.

To provide remote keyboard-mouse control, the keystrokes on the remote keyboard 144 are sent to the integrated management, graphics, input/output local/remote controller chip 120 so that they take effect locally at one or more of the servers 110,112. The mouse movement and clicks at the remote mouse 146 are sent to the integrated management, graphics, input/output local/remote controller chip 120 so that they take effect locally at one or more of the servers 110,112.

The integrated management, graphics, input/output local/remote controller chip 120 further provides for remote storage. Data stored in the remote storage device 148 can be written to one or more of the servers 110,112. This allows the remote computer system to remotely install a software operating system or software drivers into the one or more servers 110,112 from the remote storage device. Alternatively, data stored in a local data storage device of the one or more servers may be read out and stored into the remote storage device at the remote computer system. For example, a log file stored in one or more of the servers may be stored in the remote data storage device 148 so that operation of a server may be monitored or debugged.

The integrated management, graphics, input/output local/remote controller chip 120 further provides integrated graphics control so that a single graphics controller can provide local video frames of data to the local monitor 152 and changes in the local video frames of data to one or more of the remote computer systems 104A-104N for display on the remote monitor 142. Oftentimes, only a small portion of a video frame changes from one frame to the next. By sending only the changes in the video frame to the remote computer system, the wide area connection between the server farm 102 and the one or more remote computer systems can be of lower quality slow speed connections, such as an Ethernet 10BASE-T connection or digital subscriber line (DSL) modem.

The integrated management, graphics, input/output local/remote controller chip 120 further provides for remote server management of each of the plurality of central processing unit servers 110A-110M and the plurality of storage servers 112A-112N. This is oftentimes referred to as server management, hardware management, baseboard management control, or intelligent platform management. The integrated management, graphics, input/output local/remote controller chip 120 provides an integrated server management controller (also referred to as an integrated baseboard management controller (BMC)) to monitor system sensors to control the server, such as the system temperature to control the system fans, and other events that may cause system failures. The integrated server management controller of the integrated management, graphics, input/output local/remote controller chip 120 also controls the server power supply to provide the ability to remotely shutdown/restart the system for whatever reason including maintenance or overnight power conservation, for example.

The integrated management, graphics, input/output local/remote controller chip 120 further provides for remote power supply control of each of the plurality of central processing unit servers 110A-110M and the plurality of storage servers 112A-112N. An information technology support person at one of the remote computer systems 104A-104N can remotely signal the integrated management, graphics, input/output local/remote controller chip 120 to switch off the power to one or more of the servers in the server farm 102, but for standby power. An information technology support person at one of the remote computer systems 104A-104N can also remotely signal the integrated management, graphics, input/output local/remote controller chip 120 to switch on the power to one or more of the servers in the server farm 102. This remote power off and on capability may be useful to reboot an operating system for whatever reason, such as for software upgrades.

Integrated Management, Graphics, Input/Output Local/Remote Controller Chip

Figure 3:
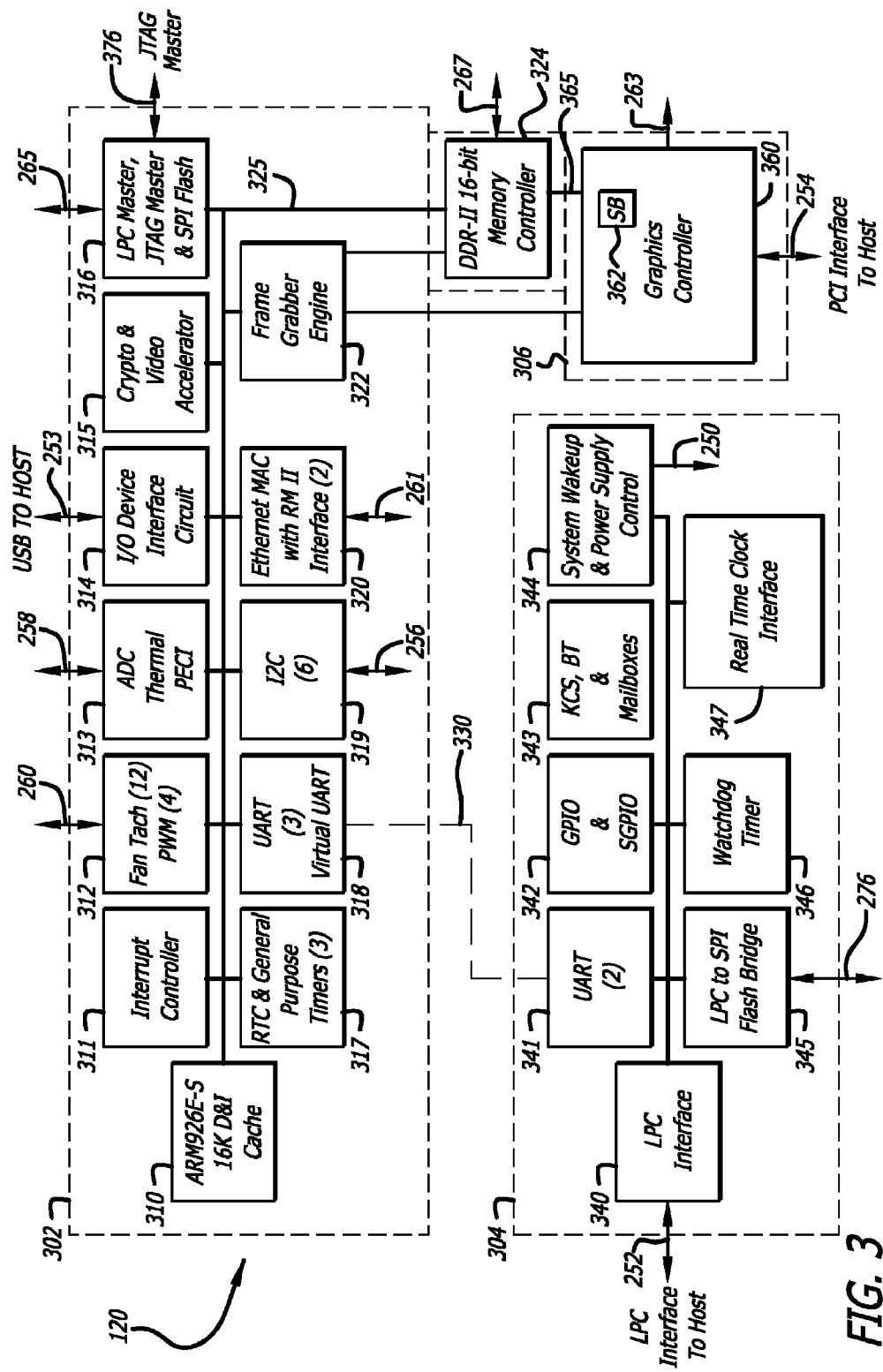
FIG. 3 is a block diagram of an integrated management, graphics, input/output remote controller chip in accordance with another embodiment of the invention.

Referring now to FIG. 3, a functional block diagram of the integrated management, graphics, input/output local/remote controller chip 120 is illustrated. The integrated management, graphics, input/output local/remote controller chip 120 is a single monolithic integrated circuit including functional blocks and subsystems in a single semiconductor substrate. That is, the integrated management, graphics, input/output local/remote controller chip 120 provides its functionality in a single chip solution.

The integrated management, graphics, input/output local/remote controller chip 120 includes a server management and remote KVM subsystem 302, a super input/output subsystem 304, and a graphics subsystem 306. The integrated management, graphics, input/output local/remote controller chip 120 includes a memory controller functional block 324 that is shared by the server management & remote KVM subsystem 302 as well as the graphics subsystem 306.

Referring now to FIG. 3 and FIG. 2, the memory controller 324 couples to the frame buffer memory 217 via a memory bus 267. In one embodiment of the invention, the memory 217 is type II DDR dynamic random access memory (DRAM) and the memory controller 324 is a sixteen bit type II DDR memory controller. The shared memory controller 324 allows for the frame buffer memory 217 to readily share its digital data in a digital pixel format with the one or more remote computer systems 104 and the local keyboard/mouse/display system 105' or the local computer system 105. In this manner, the frame buffer memory 217 is a unified memory that can provide support to multiple remote clients in a cost effective way.

The server management & remote KVM subsystem 302 further includes a server management controller 310, including a RISC processor core by Advanced Risc Machines Ltd. (ARM) and memory; an interrupt controller 311, an analog to digital converter 313 for voltage and temperature monitoring; an input/output device interface circuit 314 such as a universal serial bus (USB) interface circuit for USB1.1 and USB2.0; a cryptographer and video accelerator 315; a low pin count (LPC) master, a joint test action group (JTAG) test master, and flash memory serial peripheral interface (SPI) 316; real-time-clock (RTC) and general purpose timers 317; a plurality of universal asynchronous receive transmitters (UARTs) and a virtual UART 318; a plurality of inter-integrated circuit ("i-squared-c") interfaces 319; at least two Ethernet media access controllers 320 with a media independent interface (RMII) to couple to the physical (PHY) interface 202; and a frame grabber engine 322.

The server management controller 310 is a micro-controller that is programmed by its memory to provide baseboard management control. Thus, the server management controller 310 may also be referred to as a baseboard management controller. The server management controller 310 monitors the system temperature and controls the system fans. The server management controller 310 further monitors other events that may cause server system failures. The server management controller 310 further controls a system wakeup and power supply controller 344 to generate the power supply control signal 250 so that the server system can be substantially shutdown and restarted.

The frame grabber engine 322 couples to the memory controller 324 and the shared graphics controller 360 of the graphics subsystem 306. The frame grabber engine 322 may be used to partition a frame into tiles of data within the frame. The frame grabber engine 322 may be used to determine what tiles of a current frame have video/graphics data that has changed from the last frame. The identified changed tiles within a frame of data may then be compressed, packetized, and transmitted by the chip 120 to the remote computer systems 104 by way of the wide area network.

With a plurality of media access controllers 320, multiple clients at one or more remote computer systems 104 may connect simultaneously and view and manage one or more server systems 110 over a wide area network. Additionally, the Ethernet media access controllers 320 provide the remote connection for the remote computer systems 104 to the server management & remote KVM subsystem 302 and its elements. Key strokes and mouse movements/clicks are sent as packets from the remote computer system over the network to the Ethernet media access controller 320. The server management controller 310 processes these packets and presents key strokes and mouse movements/clicks to bus controller 314 and the host CPU via the USB interface 253 as though they were USB based keyboard/mouse commands. Remote storage devices 148 may also be presented by the bus controller 314 to the host CPU via the USB interface 253 as being USB based storage devices. The remote computer systems 104 can remotely install an operating system or drivers from the remote storage device 148 into the hard disk storage or any non-volatile storage 216 of the server by means of the Ethernet media access controller 320 and flash SPI interface 316. Additionally, the server management & remote KVM subsystem 302 and the media access controllers 320 allow a local audio stream on a universal serial bus from a microphone to be communicated to a remote client over the wide area network. Each of the media access controllers 320 may also be referred to as a network interface.

The super I/O subsystem 304 integrates together a number of communication interfaces of the server including a local USB keyboard and mouse interface for a local USB keyboard and USB mouse, and an RS232 communications interface via one or more universal asynchronous receiver transmitters for a local computer 105. The super I/O subsystem 304 provides a plurality of general purpose input/output ports and a bridge to the Basic Input/Output System (BIOS) stored in the flash memory 216. Moreover, the super I/O subsystem 304 provides an interface with the server management controller 310 of the server management & remote KVM subsystem 302. The super I/O subsystem 304 may also interface with the server management & remote KVM subsystem 302 to transparently send communications over a UART to a remote computer system 104 through the network media access controller 320 by way of the wide area network connection 261, 205.

The super I/O subsystem 304 includes a low pin count (LPC) interface 340; a plurality of universal asynchronous receive transmitters (UARTs) 341; general purpose input/output (GPIO) and serial general purpose input/output (SGPIO) interfaces 342; keyboard style interface controller (KCS), block transfer (BT) & mailbox controller 342; a system wakeup and power supply controller 344; an LPC to flash memory serial peripheral interface (SPI) bridge 345 to couple to one or more SPI flash memory devices 216; a watchdog timer 346; and a real time clock (RTC) interface 347 coupled together as shown in FIG. 3. One of the UARTs 341 of the super I/O subsystem 304 may be selectively coupled to the virtual UART 318 of the BMC & KVMS subsystem 302 by means of a selective serial communication connection 330 so that the host system may communicate using a serial communication protocol with one of the remote computer systems 104.

The system wakeup and power supply controller 344 generates the power supply control signal 250 to provide the capability to remotely shutdown/restart the system.

As mentioned previously, the graphics subsystem 306 further includes the shared graphics controller 360 that is coupled to the memory controller 324 and the frame grabber engine 322. The graphics controller 360 further interfaces to the PCI/PCI express bus 254 to couple to the one or more host processors 141 and read and write into the memory 210 in order to obtain a frame of video/graphics data for display.

Generally, the graphics subsystem 306 provides the graphics controller 360 so that frames of video/graphical data may be displayed on the local monitor 152 via the video/graphics output 263. However when remote server management is taking place at a remote computer 104, it may be desirable to turn off the local display 152 for security reasons as well as to save memory bandwidth used by the graphics controller 360 for the local display. The graphics controller includes a security bit (SB) 362 that may be set by a support person at a remote computer system 104 over the wide area network connection 205. In response to the security bit 362, the graphics controller 360 turns off the video/graphics output 263 to the local display 152. Additionally, the graphics controller 360 avoids reading data from the frame buffer memory 217 such that data traffic on the bus 365 and bus 267 is reduced thereby conserving memory bandwidth and power.

Frame Buffer Memory Capture System

Figure 4:
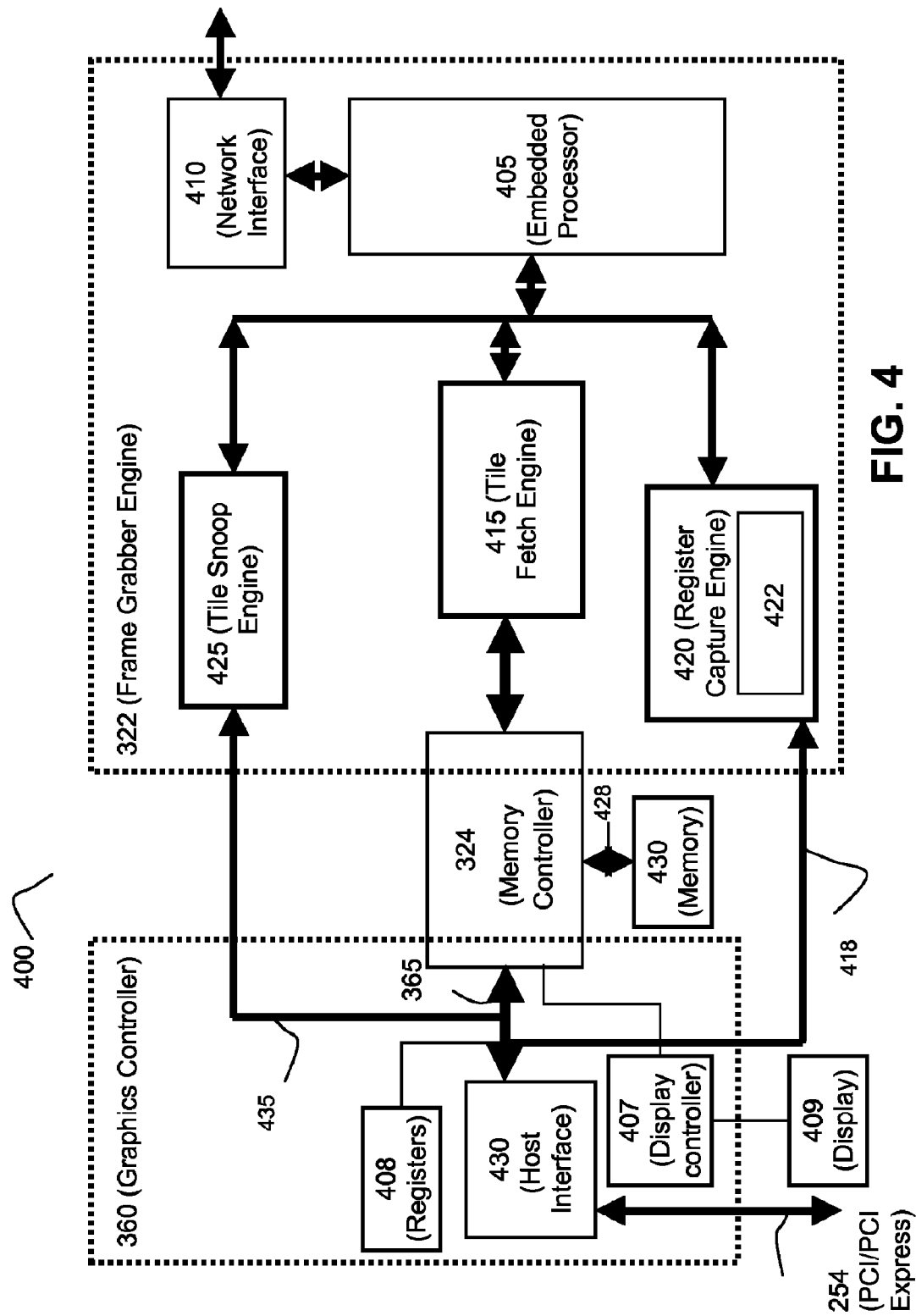
FIG. 4 is a block diagram illustrating one example of frame buffer memory capture system, in accordance with some embodiments.

FIG. 4 is a block diagram illustrating one example of frame buffer memory capture system, in accordance with some embodiments. Frame buffer memory capture system 400 may include a frame grabber engine (FGE) 322, a memory controller 324, and a graphics controller 360. As illustrated, the memory controller 324 may be coupled to both the graphics controller 360 and the FGE 322. In this configuration, the FGE 322 and the graphics controller 360 may share the memory controller 324. The memory controller 324 may control access to memory 430 via memory bus 428. The graphics controller 360 may include host interface 430 to receive information from a host processor (e.g., CPU 141 illustrated in FIG. 1) via bus 254. For example, the bus 254 may be a Peripheral Component Interconnect (PCI) or PCI express (PCIe) bus.

For some embodiments, the FGE 322 may be implemented as an integrated circuit (IC) that includes multiple components and functionalities. As will be described, some of these components may include a tile snoop engine (TSE) 425, a tile fetch engine (TFE) 415, a register capture engine (RCE) 420, and an embedded processor 405.

The memory 430 may include an area that is commonly referred to as a video memory. The video memory may include a frame buffer memory. The frame buffer memory may include information to be displayed on a local display (e.g., local display 152 illustrated in FIG. 1). The graphics controller 360 may include a display controller 407.

Register Capture Engine (RCE)

The RCE may perform operations to identify parameters associated with a display. The host processor (e.g., CPU 141 illustrated in FIG. 1) may provide information about the local display. The information may be sent by the host processor to the graphics controller 360 via the host interface 430 and the bus 254. The information may be written into a set of one or more registers 408 associated with the graphics controller 360. The registers may be located in a separate block in the graphics controller 360. The display content information about the local display may be sent from the host processor (or CPU 141) to the memory controller 324 via the host interface 430 and bus 365, and from the memory controller 324 to the memory 430 via the bus 428. Thus, the host processor updates the registers 408 and the memory 430, which in turns may be used by the display controller 407 to refresh the display 409.

The information about the local display may include display parameters such as, for example, size of the frame buffer memory, display width, display height, refresh rate, number of bits per pixel, where the first pixel starts, where the first pixel of the next line starts, etc. For some embodiments, the information about the local display may be captured by the RCE 420 via bus 418 as the information is sent from the host processor 141 to the register block 408 via bus 365. A copy of the content of the register block 408 may also be stored in the register 422 of the RCE 420. The example in FIG. 4 illustrates the bus 418 to be coupled to the bus 365.

Tile Snoop Engine (TSE)

The TSE 425 may perform operations to monitor and detect modification to the information in a frame buffer memory associated with the local display. The example in FIG. 4 also illustrates the bus 435 to be coupled to the bus 365. The bus 435 is also coupled to the TSE 425. When information in a frame buffer memory is to be modified, the host processor may send write memory address and write information to the graphics controller 360 via the host interface 430. The write memory address and the write information may then be sent to the memory controller 324 via the bus 365. By capturing the write memory address and the write information from the bus 365 using the bus 435, it is possible for the TSE 425 to monitor updates to the frame buffer memory. For example, when a write memory address is captured (e.g., by detecting a write enable bit of the bus 365), information in the frame buffer memory may be modified.

Figure 5A:
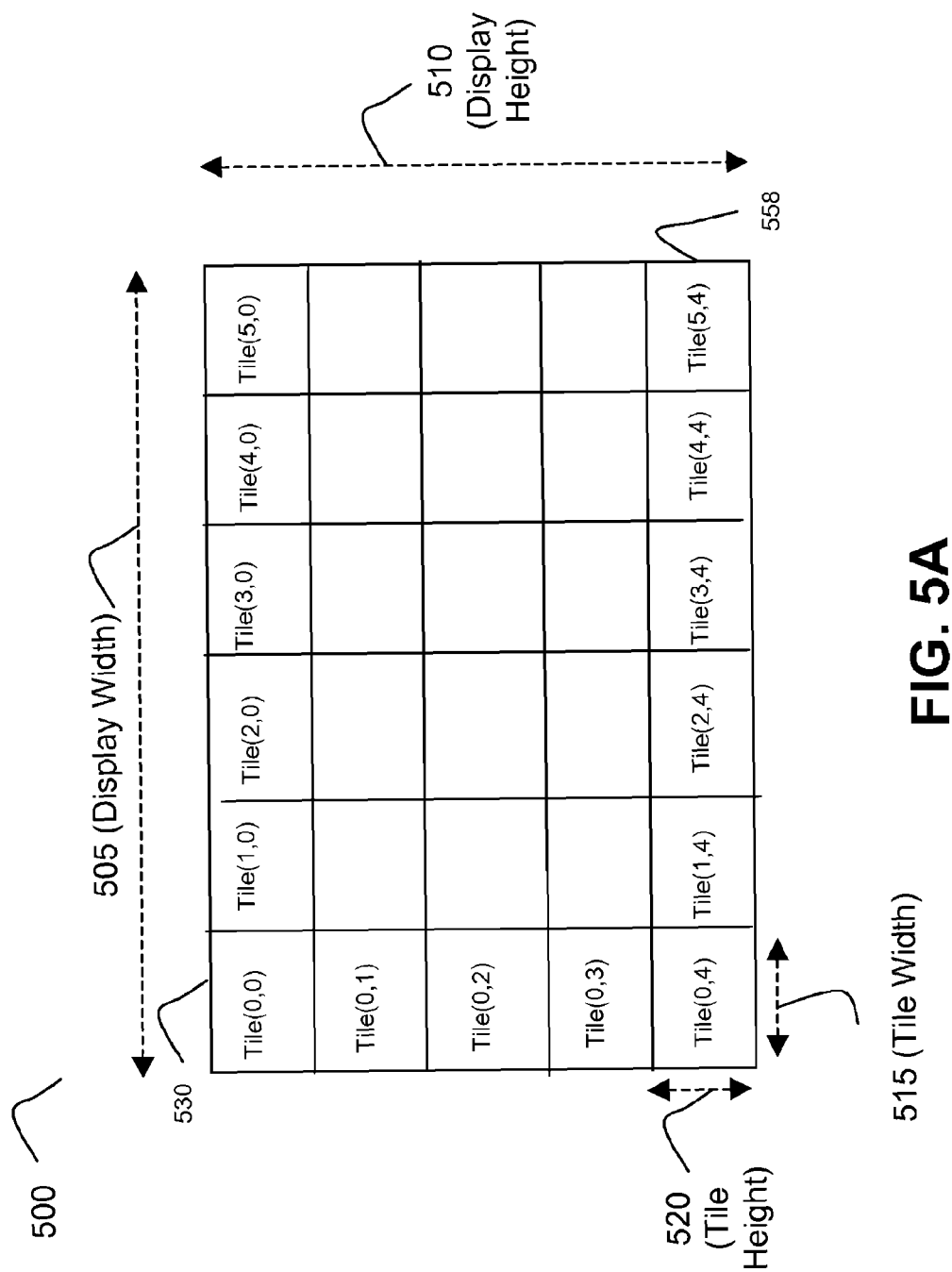
FIG. 5A illustrates one example of a display mapped into multiple display tiles, in accordance with some embodiments.

FIG. 5A illustrates one example of a display mapped into multiple display tiles or display areas, in accordance with some embodiments. Display 500 may be the local display and may include a display width 505 and a display height 510. The display 500 includes pixels that are turned off or on by pixel data that may be stored as a frame of data in memory at a frame buffer memory start address. The display 500 may be mapped into a matrix of multiple display tiles (or display areas) such as display tiles 530 and 558. The multiple display tiles are non-overlapping tiles with each tile being N pixels wide and M pixels high and having a tile start address into the frame buffer memory.

The TSE 425 may use the information captured by the RCE 420 and stored in the registers 422 (via bus 423) to determine the display width 505 and the display height 510 of the display 500. The information stored in the registers 422 may also include width of a display line (e.g., in pixels), size of a pixel (e.g., 8 bits), etc. The width of a display line may include a number of pixels in one display line along the display width 505. For example, when a resolution of a display is 1024×768, the width of a local display line is 1024 pixels from pixel 0 to pixel 1023. The width of a remote display line is also 1024 pixels from pixel 1024 to pixel 2047, and so on. The total number of display lines in this example may be 768. All the display lines may have the same width. It may be noted that each display line may include pixels that belong to different tiles. For example, when the sizes of the display tile (0,0) 530 illustrated in FIG. 5A is 3 pixels by 3 pixels, its pixels may be spread over the first three display lines. Similarly, the local display line may include pixels from the display tile 530, and other adjacent display tiles.

The TSE 425 may use the display width 505, the display height 510, and the width of the display line to determine number of display tiles, tile width 515, and tile height 520. For example, the TSE 425 may map the display 500 into a matrix of 6 display tiles horizontally and 5 display tiles vertically, starting from the local display tile (0, 0) 530 in the first row and ending with last display tile (5,4) 558 in the last row, totaling 30 display tiles.

The TSE 425 may set the tile width 515 to be equal to or different from the tile height 520. Thus, a display tile may be square where the number of pixels horizontally may be the same as the number of pixels vertically (e.g., x=y). Alternatively, a tile may be rectangle where the number of pixels horizontally may be more than the number of pixels vertically (e.g., x>y) or vice versa. For some embodiments, all the display tiles may have the same tile width and tile height. When a display is small, the size of a display tile may also be small.

It may be noted that the information in a frame buffer memory may be stored sequentially one display line after another. For example, when a display resolution is 1024 pixels horizontally by 768 pixels vertically, and there are 8 bits (or one byte) per pixel, then the local display line may be stored in the frame buffer memory from byte 0 to byte 1023, the remote display line may be stored from byte 1024 to byte 2047, etc. The TSE 425 may use the width of the display line to determine when a display line ends and when a next display line starts. Since a write memory address may point to a particular byte in the frame buffer memory, the TSE 425 may use the write memory address to determine the display tile that is modified.

The TSE 425 may use the following formula to determine the position of a modified display tile in a frame. Let "X" be the column number, and "Y" be the row number for the tile coordinates of Tile (X,Y) in the display. Using the write memory address of a pixel to be modified, the display width, the tile height, and the tile width, then "X" and "Y" may be determined as:

$Y$=quotient(memory address/(width of a display line*tile height)

$X$=quotient[remainder(write memory address/width of a display line)/tile width].

For example, when the width of a display line is 640 pixels, the tile width is 32 pixels, the tile height is 32 pixels, and the write memory address is 0xF2DF (hex) or 62175 (decimal). Then, the modified tile is determined as:

$Y$=quotient[62175/(640*32)]=3

$X$=quotient[remainder (62175/640)/32]=2
So, the modified display tile is the display tile positioned on row 3 and column 2.

Figure 5C:
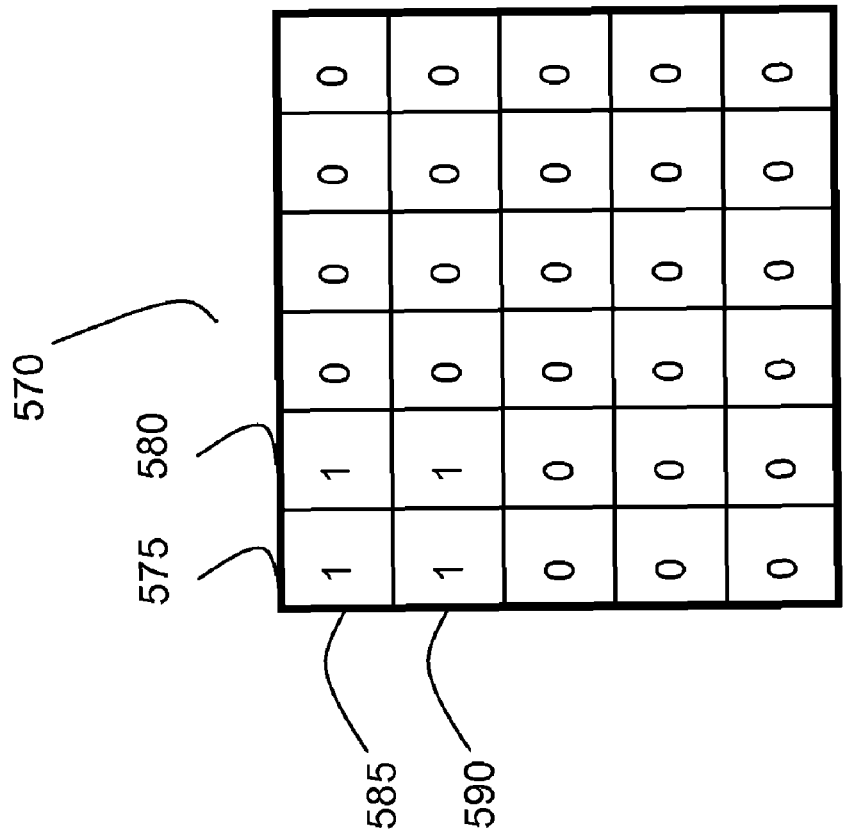
FIGS. 5B-5C illustrate two examples of bit maps, in accordance with some embodiments.
Figure 5B:
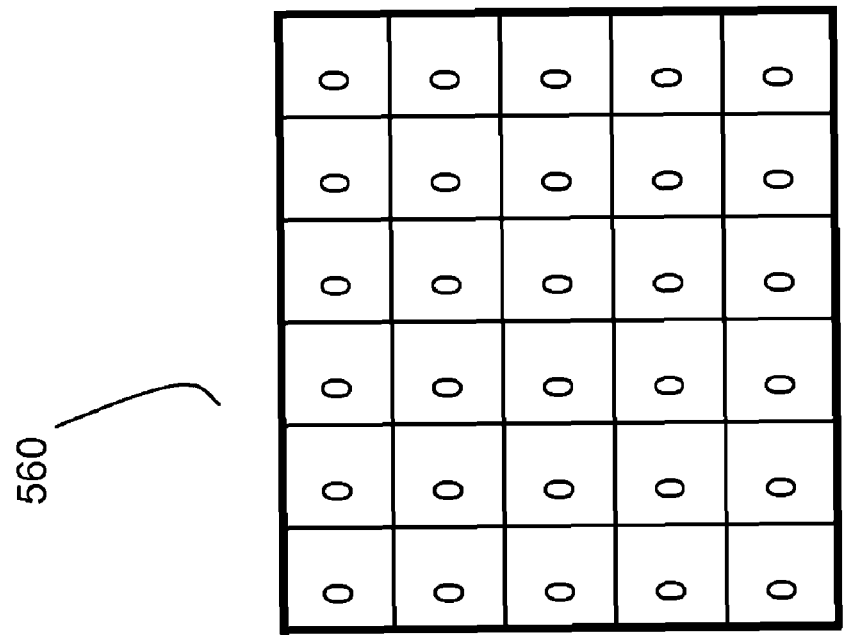

For some embodiments, the TSE 425 may implement a bit map to indicate a display tile that has been modified. The bit map may include a bit for every display tile that is mapped to the local display. FIGS. 5B-5C illustrates two examples of bit maps, in accordance with some embodiments. Bit map 560 illustrates bit values being all zero indicating an initial bit map value or a bit map value when none of the display tiles have been modified.

The TSE 425 may monitor modification to the information in the frame buffer memory and mark or set a bit in the bit map when any pixel in the corresponding display tile is modified. Bit map 570 illustrates an example where bits associated with display tiles 575, 580, 585 and 590 have been marked or set (as "1") to indicate that they are modified display tiles. The remaining bits of the bit map 570 remain unmarked (as "0") to indicate that they are not modified display tiles. For some embodiments, once the TSE 425 determines that a display tile has been modified, it may not be necessary for the TSE 425 to determine if other pixels in the same display tile also get modified. As described above, the TSE 425 may be able to determine the modified tile based on the write address. The TSE 425 may continue to monitor and mark all of the display tiles that are modified in the bit map 570 for a period of time.

For some embodiments, there may be two sets of registers to keep track of bits associated with the modified display tiles. A first set of registers may be used to store bit data to be processed, while a second set of registers may be used to set new bit data. When the bit data in the first set of registers is processed, and the new bit data is stored in the second set of registers, the roles of the first set of registers and the second set of registers may be switched. It may be noted that the operations performed by the RCE 420 and the TSE 425 may be independent of an operating system (OS) that is used with the host processor. As such, the technique may be used in a computer system running with any OS.

Tile Fetch Engine (TFE)

FIG. 6 illustrates an example of a memory buffer that stores display tiles that have been modified, in accordance with some embodiments. When the TSE 425 finishes marking all the bits corresponding to the display tiles that have been modified, the embedded processor 405 may direct the TFE 415 (via bus 406 and bus 417) to retrieve information associated with the modified display tiles from the frame buffer memory.

From the TSE 425, the TFE 415 may know about the frame buffer memory, the display width, the display height, the width of a display line, the number of bits per pixel, the tile width, and the tile height, etc. Using this knowledge, the TSE 425 may be able to retrieve information associated with a display tile from the frame buffer memory via bus 416.

Typically, in a graphics environment, changes to the information in the frame buffer memory may be connected to each other or more localized instead of being all over the place. This may enable the TFE 415 to operate more efficiently because the TFE 415 may be programmed to retrieve information associated with a group (or a rectangle) of neighboring display tiles instead of retrieving information associated with one display tile at a time.

For some embodiments, the embedded processor 405 may include logic that direct the TFE 415 to retrieve information associated with a group of display tiles that include some modified display tiles. This may be instead of just retrieving information associated with the modified display tiles individually. For example, the embedded processor 405 may determine that it may be more efficient for the TFE 415 to retrieve information associated with 9 display tiles in a 3 display tiles by 3 display tiles matrix instead of individually retrieving information associated with 5 of the same 9 tiles. Using this technique may reduce the time that the TFE 415 may need to spend determining the location of the individual display tiles in the frame buffer memory. For example, the TFE may logically OR bits down each column of a bit map (e.g., see bit maps 560,570 in FIGS. 5B-5C) to determine in what columns of display tiles changed. The TFE may further logically OR across each row of the bit map to determine in what rows of display tiles changed. With this information, display tiles may be grouped together for access from the frame buffer memory for transmission to a remote display.

FIG. 6 illustrates one example of a frame buffer memory 600. Since each pixel in the frame buffer memory 600 may be stored by display lines, it is possible to have pixels associated with a display tile to be on multiple display lines. For example, the display tile 605 (0,0) may have its pixels on three different display lines 625, 626 and 627. The same situation may apply to display tiles 630, 635, 610, 615, and 620. In this example, the display tiles 605, 630, 635 and 610 have been modified. Block 690 illustrates a bit map corresponding to the frame buffer memory 600.

For some embodiments, the TFE 415 may assemble the retrieved information associated with the modified tiles and store the data linearly in a buffer 650. The buffer 650 may be included in the memory 430. For example, the information associated with the modified display tile 605 of the frame buffer memory 600 may be stored linearly as the information associated with corresponding display tiles 655. Similarly, the information associated with the modified display tiles 630, 635 and 610 may be stored linearly as the information associated with the corresponding display tiles 660, 665, and 670.

The TFE 415 may send the information in the buffer 650 to the embedded processor 405. For some embodiments, the information in the buffer 650 may be compressed before being sent to the embedded processor 405 via bus 417 and bus 406.

The Embedded Processor

The embedded processor 405 may use the information stored by the RCE 420 in the registers 422 (via bus 406 and bus 423) to determine how the frame buffer memory is structured. If the information in the buffer 650 has not been compressed by the TFE 415, the embedded processor 405 may compress the information in the buffer 650 and send the compressed information to the network interface 410 via bus 411.

It may be noted that when the number of modified display tiles is small, the compression of the information in the buffer 650 may result in a small amount of information to be sent to the network interface 410. It may be likely that many display tiles may have pixels in the same color (all black, all white, etc.). This may enable the compression of the information in the buffer 650 to be very efficient. For example, when a display tile is entire white in color, only a few bytes of data may need to be used to represent the information in that display tile. When there are different colors in a display tile, information about all of the pixels in the display tile may need to be considered, and the resulting compressed information may be larger. Thus, a small display tile may result in better information compression. When there is lots of modification to the information in the display tile, the compression may be less efficient.

When compressing a small piece of information, it may be possible to use a limited bandwidth communication link to send the compressed information to a remote computer system associated with the remote display. The computer system associated with the remote display may be viewed as a client system operating with a set of client software. The embedded processor may also send the information about the bit map (e.g., bit map 562) generated by the TSE 425 to the client system. The client software may use the information about the bit map and the compressed information to reproduce the frame buffer memory information for displaying on the remote display.

As described above, the display controller may refresh the display 60 frames per second. Since human eyes may not differentiate changes that occur faster than 15 frames per second, it may be possible to delay the processing of the changes to the frame buffer memory. For some embodiments, the TSE 425 may accumulate changes to the display tiles over a period of time (or monitoring cycle) independent of the refresh rate. For example, the period of time may be equal to a time between frame refreshes if the frame refresh rate is 15 times per second. This may allow the embedded processor 405 to wait until the fourth frame to allow the modification to be accumulated before it tells the TFE 415 to retrieve the information associated with the modified display tiles.

Process

Figure 7:
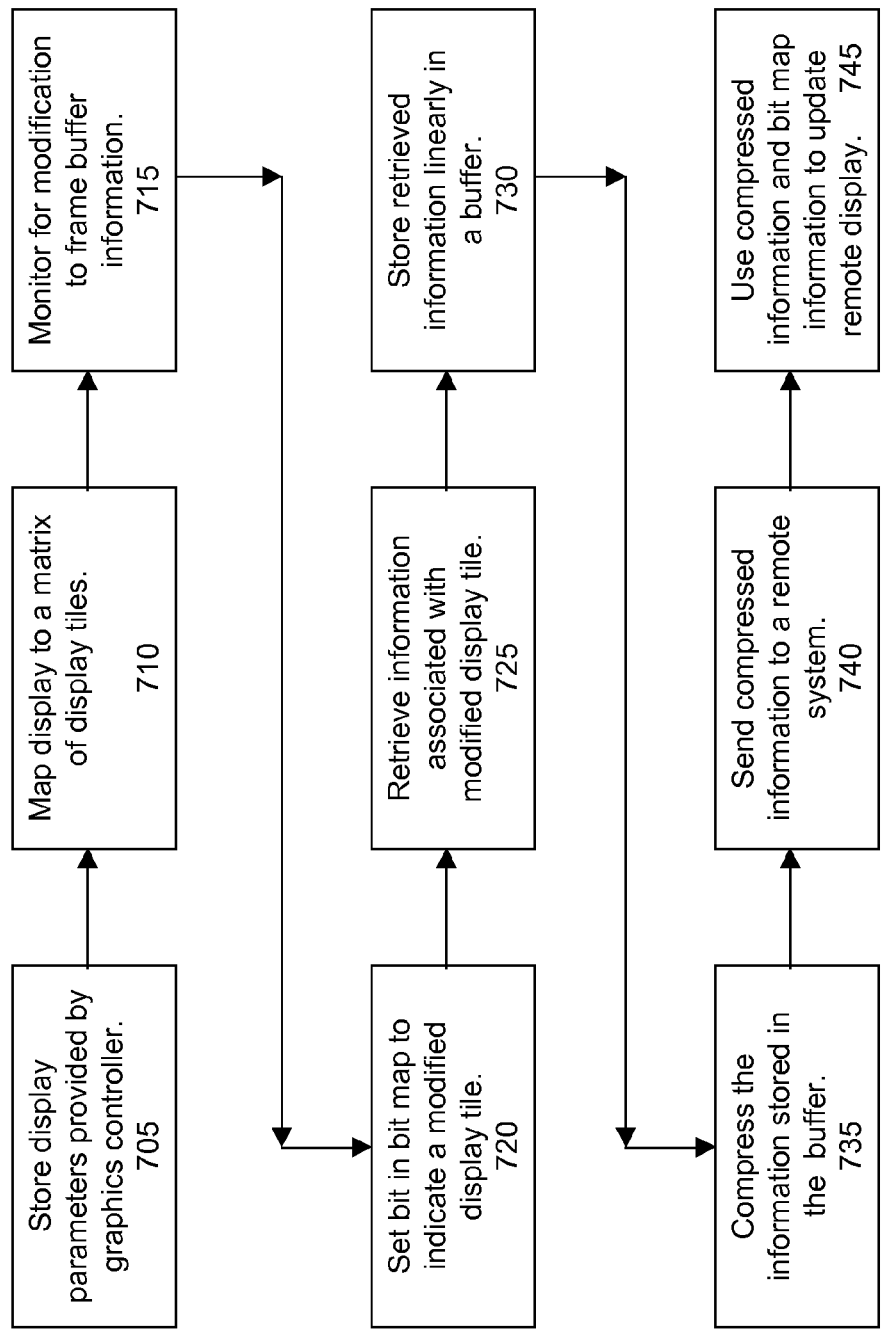
FIG. 7 illustrates one example of a process that may be performed to identify and to cause changes to display tiles associated with a local display to be displayed on a remote display, in accordance with some embodiments.

FIG. 7 illustrates one example of a process that may be performed to identify and to cause changes to display tiles associated with a local display to be displayed on a remote display, in accordance with some embodiments. The process in this example may be performed using logic associated with a local display and implemented using software, hardware or a combination of both software and hardware.

At block 705, information associated with display parameters of the local display may be captured from a graphics controller. This may be performed by the RCE 420 illustrated in FIG. 4. The display parameters may include the display height, the display width, the width of a display line, the number of bits per pixel, etc.

At block 710, the local display may be mapped to a matrix of display tiles. This may be performed by the TSE 425 illustrated in FIG. 4. The TSE may also determine the tile height and the tile width. At block 715, the TSE may monitor a bus associated with the graphics controller to identify if there may be any modification to one or more pixels in the frame buffer memory. This may be performed by comparing the monitored information with stored information. Each pixel is associated with a display tile, and a modified pixel corresponds to a modified display tile. The TSE may maintain a bit map to keep track of the modified display tiles. AT block 720, the TSE may set a bit in a bit map to indicate that a display tile has been modified. The TSE may continue to monitor for a period of time (or monitoring cycle).

At block 725, when one monitoring cycle is completed, data associated with the modified display tiles may be retrieved from the frame buffer memory. This may be performed by the TFE 415 illustrated in FIG. 4. The TFE 415 may use the display parameters and information about the display tiles to retrieve the data associated with each modified display tiles from the frame buffer memory. The TFE 415 may store the retrieved data linearly in a buffer and pass that information to an embedded processor, as shown in block 730.

At block 735, the embedded processor may compress the data stored in the buffer by the TFE 415. At block 740, the embedded processor may send the compressed data along with the information about the bit map over a communication link to a computer system associated with the remote display.

At block 745, logic in the computer system associated with the remote display may uncompress the data and use the information about the bit map to recreate changes to the frame buffer memory and to update information displayed on the remote display. The process illustrated in FIG. 7 may end at block 745. It may be understood that the sequence of the blocks illustrated in FIG. 7 may not necessarily be the exact sequence and that certain operations associated with one block may be performed out of sequence with the operations associated with the remaining blocks. It may also be understood that other operations may also be performed, and that the process may be repeated as necessary.

Computer Readable Media

The operations of the various methods of the present invention may be implemented by a processing unit in a digital processing system, which executes sequences of computer program instructions. The FGE 322 may be implemented in software, in hardware or in a combination of both software and hardware. For example, the FGE 322 may be implemented as a chip or chipset with hardware circuitry that includes an auxiliary processor dedicated to performing functions of processing changes to the frame buffer memory. The chip or chip set may further include internal memory and bus connections to the components (e.g., system CPU, system memory, etc.) in the system. The chip or chipset may also include bus connection(s) to receive information about the frame buffer memory from the graphics controller 360

As another example, the FGE 322 may be an application software including instructions that are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the CPU (e.g., system processor).

In other cases, the instructions may not be performed directly or they may not be directly executable by the CPU. Under these circumstances, the executions may be executed by causing the CPU to execute an interpreter that interprets the instructions, or by causing the CPU to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software or to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. As an example, the embedded processor 405 may not be embedded but may be on separate silicon chip. As another example, the RCE 420, the FSE 425, the TFE 415 and the embedded processor 405 may be implemented individually or integrated in one or more components. Accordingly, the specification and drawings are to be regarded in an illustrative rather than a restrictive sense.

What is claimed is:

1. An apparatus, comprising:
a first logic circuit to capture display parameters from a graphics controller including display width, display height, and width of a display line for the first display, the captured display parameters associated with a first display; and
a second logic circuit coupled to the first logic circuit, the second logic circuit configured to
monitor frame buffer memory information sent from the graphics controller to a memory controller,
detect modification of the frame buffer memory information, and
in response to the frame buffer memory information being modified, set an indicator to indicate that at least one display area of the first display has been modified,
wherein the first display is mapped into a matrix of multiple display areas in response to the captured display parameters.

2. The apparatus of claim 1, wherein
the display width, the display height, and the width of a display line are in units of pixels, and
the second logic circuit is further configured to
determine the number of multiple display areas in the matrix in response to the display width, the display height, the width of a display line and the number of bits per pixel.

3. The apparatus of claim 2, wherein
the second logic circuit is further configured to determine a height and a width of a display area in units of pixels.

4. The apparatus of claim 3, wherein
the second logic circuit to maintain a bit map, each bit in the bit map corresponding to a display area in the matrix, and
the second logic circuit to set the indicator by setting a bit in the bit map corresponding to the display area that has been modified.

5. The apparatus of claim 4, further comprising:
a third logic circuit configured to retrieve the frame buffer memory information associated with the display area that has been modified from a frame buffer memory.

6. The apparatus of claim 5, wherein
frame buffer memory information associated with a display area that has been modified is associated with two or more display lines.

7. The apparatus of claim 6, wherein
the third logic circuit to retrieve the frame buffer memory information associated with the display area that has been modified in response to the bit map, the height and width of the display area, and the width of the display line.

8. The apparatus of claim 7, wherein
in response to one or more display areas being modified, the third logic circuit to store the frame buffer memory information associated with the one or more display areas linearly in a buffer.

9. The apparatus of claim 8, further comprising:
a fourth logic circuit coupled to the third logic circuit, the fourth logic circuit configured to
compress the data stored by the third logic circuit, and
transmit information about the bit map and the compressed data over a communication link to enable modification of the frame buffer memory information to be displayed on a second display.

10. The apparatus of claim 9, wherein
the first logic circuit is a register capture engine,
the second logic circuit is a tile snoop engine,
the third logic circuit is a tile fetch engine, and
the fourth logic circuit is an embedded processor.

11. The apparatus of claim 1, wherein
the matrix of multiple display areas is a matrix of non-overlapping tiles with each tile being N pixels wide and M pixels high and having a tile start address into the frame buffer memory.

12. A system, comprising:
a host processor;
a frame buffer memory to store one or more frames of information;

and an integrated circuit (IC) coupled to the host processor and the frame buffer memory, the IC including a graphics controller and a memory controller coupled to the frame buffer memory, the IC sharing access to the memory controller with the graphics controller, wherein the IC is configured to monitor frame buffer memory information associated with a first display using display parameters associated with the first display and to identify one or more display areas affected by a modification to the frame buffer memory information, wherein the display parameters include display width, display height, width of display line, and number of bits per pixel, wherein the frame buffer memory information is sent by the host processor to the frame buffer memory, and wherein the first display is mapped to a matrix of multiple display areas.

13. The system of claim 12, wherein
the IC is to determine number of display areas in the matrix and height and width of each display area in response to the display parameters.

14. The system of claim 13, wherein
the IC to identify the modification to the frame buffer memory information by comparing the frame buffer memory information being monitored with stored frame buffer memory information.

15. The system of claim 14, wherein
the IC is to keep track of the matrix of multiple display areas including the one or more affected display areas.

16. The system of claim 15, wherein
the IC keeps track of the one or more affected display areas using one or more registers, wherein each register is to include a bit for each display area in the matrix of multiple display areas, and wherein a bit is set when its corresponding display area is affected by the modification to the frame buffer memory information.

17. The system of claim 16, wherein
the IC is further configured to use bit information in the one or more registers to retrieve frame buffer memory information associated with the one or more affected display areas.

18. The system of claim 17, wherein
the IC is further configured to compress the retrieved frame buffer memory information associated with the one or more affected display areas.

19. The system of claim 18, wherein
the IC is further configured to transmit the compressed information and the bit information in the one or more registers over a communication link to a remote computer system where they are to be used to update information displayed on a second display.

20. The system of claim 19, wherein
the communication link is a limited bandwidth communication link.

21. A method, comprising:
receiving display parameters from a graphics controller associated with a first display, the display parameters including display width, display height, width of a display line, and number of bits per pixel;
mapping the first display to a matrix of display areas;
detecting modification to frame buffer memory information associated with the first display;
identifying one or more display areas affected by the modification to the frame buffer information;
retrieving frame buffer memory information associated with the one or more affected display areas; and
updating information displayed on a second display based on the retrieved frame buffer information associated with the one or more affected display areas.

22. The method of claim 21, wherein
mapping the first display to a matrix of display areas comprises:
using the display parameters to determine the number of display areas and the height and the width of a display area.

23. The method of claim 22, wherein
detecting the modification to the frame buffer memory information associated with the first display comprises detecting a write memory address.

24. The method of claim 23, wherein
the write memory address is detected by monitoring a bus coupling the graphics controller to a memory controller associated with the first display.

25. The method of claim 24, wherein
the write memory address is used to identify an affected display area.

26. The method of claim 23, wherein
identifying the one or more display areas affected by the modification to the frame buffer memory information comprises:
using the display parameters and the write memory address to identify the location of a pixel to be modified; and
using the location of the pixel to be modified, the width of the display line and the height and width of a display area to identify a display area affected by the modification.

27. The method of claim 26, further comprising:
setting a bit in a bitmap to indicate a display area affected by the modification, wherein the bitmap is to include a bit corresponding to each display area in the matrix of display areas.

28. The method of claim 27, wherein
the frame buffer memory information associated with the one or more affected display areas is retrieved using information in the bitmap, the width of the display line, and the height and width of a display area.

29. The method of claim 28, wherein
updating the information displayed on a second display based on the retrieved frame buffer memory information associated with the one or more affected display areas comprises:
storing the retrieved information linearly;
compressing the stored information; and
transmitting the compressed information and the information in the bit map over a communication link to a computer system associated with the second display.

30. A non-transitory computer readable medium having stored thereon sequences of instructions which are executable by a system, and which, when executed by the system, cause the system to perform a method, comprising:
detecting modification to frame buffer memory information associated with a first display, wherein the frame buffer memory information corresponds to information displayed in display areas associated with the first display, wherein a number of the display areas is determined based on display parameters including display width, display height, width of a display line in pixels, and width and height of a display area in pixels;
identifying one or more display areas affected by the modification to the frame buffer information;

retrieving the frame buffer memory information associated with the one or more display areas affected by the modification to the frame buffer information; and transmitting frame buffer memory information associated with the one or more display areas affected by the modification over a communication link to be displayed on a second display.

31. The non-transitory computer readable medium of claim 30, wherein the one or more display areas affected by the modification to the frame buffer memory information is identified using a write memory address and the display parameters.

32. The non-transitory computer readable medium of claim 31, wherein a bit map is used to keep track of the one or more display areas affected by the modification to the frame buffer memory information.

33. The non-transitory computer readable medium of claim 32, wherein the frame buffer memory information associated with the one or more display areas affected by the modification is stored linearly and compressed before being transmitted along with information about the bit map over the communication link.

* * * * *